United States Patent [19]

Sasaki et al.

[11] Patent Number: 4,690,986
[45] Date of Patent: Sep. 1, 1987

[54] IMPACT-RESISTANT THERMOPLASTIC POLYORGANOSILOXANE-BASED GRAFT COPOLYMER AND PROCESS FOR PRODUCING SAME

[75] Inventors: Isao Sasaki, Hiroshima; Akira Yanagase; Yasunori Kawachi, both of Otake; Tetsuya Mayuzumi, Kawagoe; Toshio Oba, Annaka; Fumio Okada, Takasaki, all of Japan

[73] Assignees: Mitsubishi Rayon Co., Ltd.; Shin-Etsu, Chemical Co., Ltd., both of Tokyo, Japan

[21] Appl. No.: 904,463

[22] Filed: Sep. 8, 1986

Related U.S. Application Data

[63] Continuation-in-part of Ser. No. 726,462, Apr. 24, 1985, abandoned.

[30] Foreign Application Priority Data

May 30, 1984 [JP] Japan .................. 59-108492

[51] Int. Cl.⁴ .......................................... C08F 283/12
[52] U.S. Cl. ...................... 525/479; 528/32
[58] Field of Search ........................... 525/479

[56] References Cited

U.S. PATENT DOCUMENTS

| | | | |
|---|---|---|---|
| 3,575,910 | 4/1971 | Thomas . | |
| 3,878,263 | 4/1975 | Martin | 528/32 |
| 3,898,300 | 8/1975 | Hilliard | 525/106 |
| 4,071,577 | 1/1978 | Falender et al. | 525/479 |
| 4,201,808 | 5/1980 | Cully et al. | 525/479 |
| 4,277,595 | 7/1981 | Deichert et al. | 525/479 |
| 4,322,517 | 3/1982 | Deubger et al. | 525/479 |

FOREIGN PATENT DOCUMENTS

| | | |
|---|---|---|
| 8000253 | 2/1980 | PCT Int'l. Appl. . |
| 2093471 | 9/1982 | United Kingdom . |

OTHER PUBLICATIONS

Chem Abstracts, vol. 100 (1984), No. 8, Columbus, Ohio, USA, pp. 35 and 36.

Primary Examiner—Wilbert J. Briggs, Sr.
Attorney, Agent, or Firm—Cushman, Darby & Cushman

[57] ABSTRACT

A polyorganosiloxane-based high-impact thermoplastic graft copolymer superior in impact resistance, light resistance, surface gloss and color fastness produced by the emulsion graft polymerization of at least one vinyl monomer on an emulsion-polymerized polyorganosiloxane which consists of 90 to 99.8 mole % of an organosiloxane unit represented by the formula

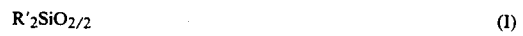

$$R'_2SiO_{2/2} \qquad (I)$$

wherein R' is the same or different and denotes methyl, ethyl, propyl, or phenyl, 0.1 to 10 mole % of a unit derived from a graft-linking agent, said unit being represented by the formula

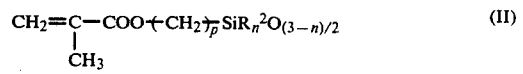

$$CH_2{=}C{-}COO{\leftarrow}CH_2{\rightarrow_p}SiR_n^2O_{(3-n)/2} \qquad (II)$$
$$\underset{CH_3}{|}$$

wherein; R² denotes methyl, ethyl, propyl, or phenyl; n denotes a number of 0, 1, and 2; and p denotes a number of 1 to 6, and 0.1 to 10 mole % of a unit derived from a tetrafunctional silane crosslinking agent, said unit being represented by the formula

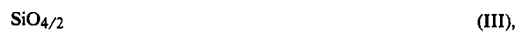

$$SiO_{4/2} \qquad (III),$$

said polyorganosiloxane showing a degree of swelling of 5 to 15 in toluene, and said graft copolymer containing said polyorganosiloxane in an amount of 10 to 70% by weight; and a process for producing the said graft copolymer.

18 Claims, No Drawings

IMPACT-RESISTANT THERMOPLASTIC POLYORGANOSILOXANE-BASED GRAFT COPOLYMER AND PROCESS FOR PRODUCING SAME

This application is a continuation-in-part application of Ser. No. 726,462 filed Apr. 24, 1985, now abandoned.

The present invention relates to an impact-resistant, thermoplastic polyorganosiloxane-based graft copolymer obtainable in high graft efficiency and to a process for producing the same.

Polyorganosiloxanes generally exhibit low reactivity upon vinyl monomers and it is difficult to form a chemical bond thereof to vinyl monomer. Several methods for the bond formation are disclosed but the results are not always satisfactory. For instance, U.S. Pat. No. 3,898,300 reports that a graft copolymer improved in impact strength is formed by polymerizing a vinyl monomer in an emulsion of vinylsiloxane- or allylsiloxane-containing polydimethylsiloxane. However, the patent indicates that the apparent percentage of grafting calculated from the quantity of gel formed, i.e. the amount ratio (%) of the graft polymer to the polydimethylsiloxane used, is at most about 76%, and that the apparent graft efficiency similarly calculated, i.e. the amount ratio (%) of the grafted monomer to the total polymerized monomer, is as low as about 16%.

U.S. Pat. No. 4,071,577 describes the method of improving the product graft copolymer in impact strength by using a mercaptosiloxane in place of said vinyl-group containing siloxanes. That is, the impact strength of the resulting polymer is greatly varied with the content of mercapto group in the dimethylsiloxane-mercaptopropylsiloxane copolymer used, indicating that the presence of the graft polymer formed through the mediation of mercapto groups betters impact characteristics of the product. However, it is not clear whether the structure of the graft copolymer is appropriate or not, since no explicit description of the percentage of grafting is given in the patent specification. Experiments by the present inventors tracing this graft polymerization have shown percentages of grafting of up to 82% and a graft efficiency of 20.5%. Thus the graft copolymer of this patent is not regarded as a sufficiently uniform polymer composition.

Under such circumstances, the present inventors made intensive studies with an aim at producing a more uniform graft copolymer based on polyorganosiloxane. As a result a particular graft-linking agent has been found to give exceptionally high graft efficiency.

The present invention, based on the above finding, involves an impact-resistant, thermoplastic polyorganosiloxane-based graft copolymer produced by the emulsion graft polymerization of at least one vinyl monomer on an emulsion-polymerized polyorganosiloxane which consists of 90 to 99.8 mole % of an organosiloxane unit represented by the formula $$R'_2SiO_{2/2} \qquad (I)$$

wherein R' is the same or different and denotes methyl, ethyl, propyl, or phenyl, 0.1 to 10 mole % of a unit derived from a graft-linking agent, said unit being represented by the formula $$CH_2=\underset{CH_3}{\underset{|}{C}}-COO\text{\textendash}CH_2\text{\textendash}_p SiR_n^2 O_{(3-n)/2} \qquad (II)$$

wherein; $R^2$ denotes methyl, ethyl, propyl, or phenyl; n denotes a number of 0, 1, and 2; and p denotes a number of 1 to 6, and 0.1 to 10 mole % of a unit derived from a tetrafunctional silane crosslinking agent, said unit being represented by the formula $$SiO_{4/2} \qquad (III),$$

said polyorganosiloxane showing a degree of swelling of 5 to 15 in toluene, and said graft copolymer containing said polyorganosiloxane in an amount of 10 to 70% by weight.

In the formula (II) above, p is preferably a number of 2 to 4, more preferably a number of 3.

The impact-resistant, thermoplastic polyorganosiloxane-based graft copolymer of the invention can be produced by a process, which comprises the steps of (A) emulsion copolymerization of (i) an organosiloxane compound capable of forming an organosiloxane unit represented by the formula $$R'_2SiO_{2/2} \qquad (I)$$

wherein R' is the same or different and denotes methyl, ethyl, propyl, or phenyl, (ii) a graft-linking agent capable of forming a unit represented by the formula $$CH_2=\underset{CH_3}{\underset{|}{C}}-COO\text{\textendash}CH_2\text{\textendash}_p SiR_n^2 O_{(3-n)/2} \qquad (II)$$

wherein; $R^2$ denotes methyl, ethyl, propyl, or phenyl; n denotes a number of 0, 1, and 2; and p denotes a number of 1 to 6, and (iii) a tetrafunctional silane crosslinking agent capable of forming a unit represented by the formula $$SiO_{4/2} \qquad (III)$$

to prepare a polyorganosiloxane which consists of 90 to 99.8 mole % of the unit of the formula (I), 0.1 to 10 mole % of the unit of the formula (II), and 0.1 to 10 mole % of the unit of the formula (III) and shows a degree of swelling of 5 to 15 in toluene, and (B) emulsion graft polymerization of at least one vinyl monomer on said polyorganosiloxane to produce the intended graft copolymer containing said polyorganosiloxane in an amount of 10 to 70% by weight.

The percentage of grafting on the thus obtained impact-resistant, thermoplastic polyorganosiloxane-based graft copolymer can be varied widely, up to 230%, depending on the content of methacryloyloxy group therein. In addition, the particle shape and dispersibility of the graft copolymer, which are dependent on the graft structure, are easy to control. Accordingly, the graft copolymer gives uniform molded articles having high surface gloss and superior impact resistance. While the graft copolymer of a polymer having siloxane bonds has not been obtained up to now unless an anionic polymerization using an alkali metal is applied, such a graft copolymer can be readily obtained by a two-stage emulsion polymerization according to the industrial emulsion polymerization technique according to the present invention.

Important factors of the graft structure include the ratio of the grafted monomer to the polymerized monomer, viz. graft efficiency, besides the ratio of the grafted polymer to the backbone polymer, viz. the percentage of grafting. The control of the graft efficiency for polyorganosiloxanes is extremely difficult according to the prior art processes.

Two compounds are known as graft-linking agents used in the prior art processes. One of them is a vinylsiloxane capable of forming a unit represented by the general formula

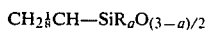
$$CH_2\!=\!CH-SiR_aO_{(3-a)/2}$$

wherein R denotes methyl, ethyl, propy, or phenyl, and a denotes a number of 0, 1, or 2. The other of them is a mercaptosiloxane capable of forming a unit represented by the formula

$$HS\!-\!(CH_2)_q\!SiR_aO_{(3-a)/2}$$

wherein R denotes methyl, ethyl, propy, or phenyl, a denotes a number of 0, 1, or 2, and q denotes a number of from 1 to 6. With any of these graft-linking agents, it is difficult to achieve a graft efficiency of 40% or more. In contrast to this, the graft-linking agent capable of forming a unit represented by the formula (II) gives with ease not only a high percentage of grafting but also a graft efficiency as high as 40% or more.

In the production of the graft copolymer of the invention, the polyorganosiloxane is prepared by first adding a graft-linking agent capable of forming a unit represented by the formula (II) and a tetrafunctional silane crosslinking agent capable of forming a unit represented by the formula (III) to an organosiloxane compound capable of forming a unit represented by the formula (I) and thereafter carrying out the emulsion polymerization of the resulting mixture.

The organosiloxane compound capable of forming a unit represented by the formula (I) is in cyclic form and includes various cyclic organosiloxanes in the form of three- or more-membered ring, preferably of three- to six-membered ring. Such organosiloxane compounds include, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These may be used alone or in combination. The organosiloxane compound is used in such an amount that the content of the unit represented by the formula (I) in the polyorganosiloxane will be in the range of 90 to 99.8 mole %.

The graft-linking agent capable of forming a unit represented by the formula (II) is an organosiloxane compound containing a methacryloyloxy group, for example, β-methacryloyloxyethyldimethoxymethylsilane, γ-methacryoyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, or δ-methacryloyloxybutyldiethoxymethylsilane.

The graft-linking agent is used in such an amount that the content of the unit represented by the formula (II) in the polyorganosiloxane will be in the range of 0.1 to 10 mole %.

When the amount is less than 0.1 mole %, the percentage of grafting will be too low and the intended graft effect will not be obtained. While the percentage of grafting increases in proportion to the amount of the graft-linking agent used, the polymerization degree of the resulting graft copolymer lowers as the amount of the graft-linking agent is increased. Therefore this amount is desired to be up to 10 mole %. However, with the increase in the amount of the graft-linking agent, the proportion of the vinyl polymer not linked to the polyorganosiloxane much reduces, that is, the graft efficiency can be remarkably raised; there is the enough possibility that a graft efficiency of 90% or more is achieved, when appropriate polymerization conditions are chosen.

Thus, the methacryloyloxysiloxane (the graft-linking agent capable of forming a unit represented by the formula II), as compared with the vinylsiloxane and mercaptosiloxane, affords very wide grafting latitude. When the graft copolymer of the invention is produced by using the polyorganosiloxane as a backbone polymer, a wide variety of conditions for grafting various vinyl monomers can be chosen by using the methacryloyloxysiloxane capable of forming a unit represented by the formula II.

It is desirable to produce the polyorganosiloxane according to the method described in U.S. Pat. Nos. 2,891,920 and 3,294,725.

In the present invention, the polyorganosiloxane is prepared desirably in the way of shearing-mixing the organosiloxane compound capable of forming a unit represented by the formula (I), the graft-linking agent capable of forming a unit represented by the formula (II), and the tetrafunctional silane crosslinking agent capable of forming a unit represented by the formula (III), in the presence of a sulfonic acid type emulsifier such as alkylbenzenesulfonic acid, alkylsulfonic acid, or the like by using, for example, a homogenizer. Joint use of a metal alkylbenzenesulfonate, a metal alkylsulfonate, or the like in this case is desirable since this is effective for keeping the polymer stable during the graft polymerization. Alkylbenzenesulfonic acid is best suited since it acts as an emulsifying agent and at the same time as a polymerization initiator.

When the organosiloxane is polymerized in emulsified form, the subsequent graft polymerization can be carried out in fine particles. This is favorable for the production of impact-resistant resins. Since the high impact resistance of the present type of graft copolymer is developed only when fine rubber spheres are dispersed, there is significant correlation between the particle diameter of this organosiloxane rubber and the impact resistance of the graft copolymer. Accordingly, the particle diameter of the polyorganosiloxane rubber is controlled in the range of 0.05 to 1 μm, preferably 0.08 to 0.5 μm. The particle diameter of this rubber can be properly controlled with the amounts of the above-mentioned sulfonic acid type emulsifier and either the metal alkylbenzenesulfonate or the metal alkylsulfonate to be used.

The crosslinking agent capable of forming a unit represented by the formula (III) is a tetrafunctional crosslinking agent and provides impact resistance to the graft copolymer by crosslinking the polyorganosiloxane. This tetrafunctional silane crosslinking agent is exemplified by tetramethoxysilane, tetraethoxysilane, and tetra-n-propoxysilane, of which tetramethoxysilane and tetraethoxysilane are preferable. Tetraethoxysilane is particularly preferable. This crosslinking agent is used in such an amount that the content of the unit represented by the formula (III) in the polyorganosiloxane will be in the range of 0.1 to 10 mole %. Thus the degree of swelling (the ratio by weight of toluene absorbed by polyorganosiloxane when it is saturated with toluene at 25° C.) of the polyorganosiloxane can be controlled to from 5 to 15.

An intimate correlation exists between the impact resistance of the present impact-resistant graft copolymer and the crosslinking density of the polyorganosiloxane rubber. When the crosslinking density is too high, that is, the polyorganosiloxane rubber is excessively hardened, it will lack shock absorbing power and will behave like a simple filler. On the contrary, when the crosslinking density is too low, the domain of rubber will not be formed. The rubber will lack shock absorbing power and the impact-resistant resin can not be obtained. Therefore the crosslinking density expressed by the degree of swelling is strictly controlled.

The degree of swelling is measured in the following way: A prepared polyorganosiloxane latex is broken to coagulate by adding it to about from 3 to 5 times the volume thereof of isopropyl alcohol, thereby recovering the organosiloxane polymer. The thus obtained polymer is washed with water, and vacuum-dried at 80° C. for 10 hours. Then about 1 g of the polymer is immersed in about 30 g of toluene at 25° C. for 100 hours to swell with toluene. The excess toluene is separated by decantation, the swelled polymer is vacuum-dried at 80° C. for 16 hours to evaporate and remove the absorbed toluene, and the resulting polymer is weighed. The degree of swelling is calculated according to the following equation:

$$\text{Degree of swelling} = \frac{\text{(Weight of swelled polymer)} - \text{(Weight of dry polymer)}}{\text{(Weight of dry polymer)}}$$

In the next place, a vinyl monomer is emulsion graft-polymerized onto the polyorganosiloxane emulsion-polymerized with the graft-linking agent capable of forming a unit of formula (II) and the crosslinking agent capable of forming a unit of formula (III). Suitable vinyl monomers for this purpose include, for example; aromatic alkenyl compounds such as styrene and α-methylstyrene; methacrylates such as methyl methacrylate, ethyl methacrylate, 2-ethylhexyl methacrylate, and butyl methacrylate; acrylates such as methyl acrylate, ethyl acrylate, and butyl acrylate; vinyl cyanide compounds such as acrylonitrile and methacrylonitrile; conjugated diolefins such as butadiene, isoprene, and chloroprene; vinyl acetate, vinyl chloride, vinylidene chloride, allyl methacrylate, triallyl isocyanurate, and ethylene dimethacrylate. These can be used alone or in combination. A favorable graft copolymer as an impact-resistant composition is produced by using at least one monomer selected from the group consisting of aromatic alkenyl compounds and vinyl cyanid compounds, especially a monomer mixture of styrene (65–75 wt.%) and acrylonitrile (35–25 wt.%).

The vinyl monomer is used in such amounts that the proportion of the polyorganosiloxane based on the total amount of the polyorganosiloxane and the vinyl monomer lies in the range of 10 to 70%, preferably 20 to 60%, by weight.

The vinyl monomer can be graft-polymerized onto the polyorganosiloxane by the usual radical emulsion polymerization method. For the emulsion graft polymerization, various radical-polymerization initiators can be used. These initiators need to be added before graft polymerization. Depending on the nature of the initiator, the polyorganosiloxane latex acidified with alkylbenzenesulfonic acid may need to be neutralized with an alkali. Examples of the alkali used are sodium hydroxide, potassium hydroxide, sodium carbonate, sodium hydrogencarbonate, triethanolamine, triethylamine.

Suitable radical-polymerization initiators for use in the invention include, for example; organic peroxides such as tert-butyl peroxide, dicumyl peroxide, tert-butyl perphthalate, tert-butyl perbenzoate, tert-butyl peracetate, di-tert-amyl peroxide, methyl isobutyl ketone peroxide, lauryl peroxide, cyclohexanone peroxide, 2,5-dimethyl-2,5-di-tert-butyl peroxyhexane, tert-butyl peroctanoate, tert-butyl perisobutyrate, tert-butyl peroxyisopropylcarbonate, and diisopropyl peroxydicarbonate; azo compounds such as dimethyl-2,2'-azobisisobutyrate, 1,1'-azobiscyclohexanecarbonitrile, 2-phenylazo-2,4-dimethyl-4-methoxyvaleronitrile, 2-carbamoylazoisobutyronitrile, 2,2'-azobis-2,4-dimethylvaleronitrile, and 2,2'-azobisisobutyronitrile; and redox type initiators such as hydroperoxide-ferrous sulfate-glucose-sodium pyrophosphate, hydroperoxide-ferrous sulfate-dextrose-sodium pyrophosphate-sodium phosphate, hydroperoxide-ferrous sulfate-sodium pyrophosphate-sodium phosphate, hydroperoxide-ferrous sulfate-formaldehyde sodium sulfoxylate-ethylenediamine acetate, persulfuric acid salt-hexacyano iron (II) potassium, and persulfuric acid salt-sodium thiosulfate-copper sulfate. For these redox type initiators; suitable hydroperoxides are, for example, cumene hydroperoxide, tert-butyl hydroperoxide, diisopropylbenzene hydroperoxide, p-menthane hydroperoxide, 1,1,3,3-tetramethylbutyl hydroperoxide, and 2,5-dimethylhexane-2,5-dihydroperoxide; suitable persulfates are, for example, potassium persulfate and ammonium persulfate. Persulfates can also be used alone.

The percentage of grafting of the graft copolymer was determined in the following way: The graft copolymer latex is added to about 3 to 5 times the volume thereof of methanol with stirring to coagulate, thereby recovering the graft copolymer. The thus obtained copolymer is washed with water, and vacuum-dried at 80° C. for 10 hours to remove the moisture. Then, about 1 g of the polymer is added to about 50 ml of acetone. The acetone-soluble vinyl polymer not linked to the polyorganosiloxane is dissolved in acetone by heating the mixture to boil the acetone for about 5 hours. After cooling, the mixture is centrifuged at a revolution of about 10,000 rpm for 1 hour, to separate the polymer linked to the polyorganosiloxane from the acetone-soluble polymer by decantation. Further, addition of acetone to the separated polymer linked to the polyorganosiloxane, centrifugation, and decantation are similarly repeated to wash the polymer, which is then vacuum-dried at 80° C. for 10 hours. The residue of acetone extraction is weighed. The percentage of grafting and the graft efficiency are calculated according to the following equations:

Percentage of grafting (%) =

$$\frac{\text{(Weight of acetone} - \text{(Weight of poly-}}{\text{extraction residue)} - \text{organosiloxane)}} \times 100$$
$$\text{(Weight of polyorganosiloxane)}$$

$$\text{Graft efficiency (\%)} = \frac{\text{(Weight of grafted monomer)} \times 100}{\text{(Weight of total monomer polymerized)}}$$

The obtained graft copolymer latex is coagulated by the usual salt coagulation method. The separated solid is washed, dried, and formed into pellets through an extruder. This pelletizing also may be conducted with a previously prepared vinyl polymer added for the purpose of adjusting the content of polyorganosiloxane in the pellets to the desired value. Before pelletizing, a filler, heat stabilizer, ultraviolet aborber, lubricant, etc. can be added to the polymer. The pelletized polymer is formed by common processing methods including compression molding, injection molding, and so forth.

Formed articles comprising the graft copolymer of the invention or comprising a resin composition containing it have generally high impact strength with a low content of polyorganosiloxane and exhibit superior properties such as good weather resistance, good surface gloss, and low yellowing tendency.

The impact-resistant, thermoplastic polyorganosiloxane-based graft copolymer of the present invention exhibits superior impact resistance at low temperatures as well since the polyorganosiloxane used therein as a shock absorber has a low glass transition temperature.

The impact strength of molded articles in the following examples was determined on injection molded, molding-notched test pieces (notch angle 45°, notch depth 0.1 inch) in accordance with ASTM D-256-56. The surface gloss of the formed article was determined in accordance with ASTM D-523-62T and expressed by the value (%) relative to the glass surface gloss regarded as 100.

The following examples illustrate the invention in more detail. In these examples, parts are all by weight.

EXAMPLE 1

Tetraethoxysilane (1.0 part), γ-methacryloyloxypropyldimethoxymethylsilane (0.75 part), and octamethylcyclotetrasiloxane (100 parts) were mixed together and added to distilled water (300 parts) containing dodecylbenzenesulfonic acid (1.0 part) dissolved. The mixture was preliminary stirred in a homomixer and then emulsified by passing twice through a homogenizer under a pressure of 250 kg/cm².

The emulsion was displaced into a separable flask equipped with a condenser, nitrogen inlet port, and stirrer, and was heated with stirring at 90° C. for 6 hours to complete polymerization. The yield of the polymer was 90.3%, the degree of swelling of the polymer was 10.2, and the particle size (average) thereof was 0.14 μm as measured by the turbidity method.

This polyorganosiloxane latex was neutralized with aqueous $Na_2CO_3$ to pH 8. Distilled water (700 parts) and potassium persulfate (1.5 parts) were added to the latex. The mixture was displaced into a separable flask equipped with a dropping funnel, condenser, nitrogen inlet port, and stirrer, and was heated to 75° C. under a stream of nitrogen. Then a mixture of acrylonitrile (50 parts) and styrene (150 parts) was added slowly from the dropping funnel over 4 hours to be graft polymerized. After completion of the addition, the polymerization was continued for 2 hours. Thus the polymerization was substantially completed. Then the mixture was cooled.

The particle size of the resulting latex was 0.30 μm. This latex was poured into an aqueous solution of $CaCl_2.2H_2O$ (15 parts) to salt out the polymer. The polymer was isolated, washed well with water, and dried at 80° C. for 16 hours to give a polyorganosiloxane-based graft copolymer. The percentage of grafting and the graft efficiency were 93.5% and 46.8%, respectively. The percentage of monomer polymerized was 99.8%.

The polyorganosiloxane content in this graft polymer was 33.3 wt.%.

This graft copolymer in powder form was heated to 260° C. and pelletized by using a single screw extruder (L/D=25). The resulting pellets were injection molded into Izod impact test specimens (¼ in. thick molding-notched flat plates) and test specimens for surface gloss measurement. These specimens showed an Izod impact strength cf 32 kg.cm/cm² and a surface gloss of 74%.

This graft copolymer in powder form and an acrylonitrile-styrene copolymer prepared specially (proportions by weight of charged monomers 25:75) were mixed in proportions of 60:40 (wt %). The mixture was pelletized through a single screw extruder (L/D=25) at an extrusion temperature of 220° C. The resulting pellets were injection molded into specimens (molding-notched flat plates ¼ inch thick) for Izod impact tests and test specimens for surface gloss measurement. The Izod impact strength was 48 kg.cm/cm² and the surface gloss of the flat plates was 90%. Further, Izod impact strengths of these test specimens, measured at 0° C., −30° C., −40° C., and −60° C., were 40, 31, 25, and 19 kg.cm/cm², respectively, surpassing those of the common ABS resin based on butadiene rubber.

EXAMPLE 2

A polyorganosiloxane rubber was prepared and then acrylonitrile and styrene were graft-polymerized onto the rubber, by the same procedure of Example 1 but using various amounts of γ-methacryloyloxypropyldimethoxymethylsilane as graft-linking agent. Each of the thus obtained graft copolymers and the same acrylonitrile-styrene copolymer as used in Example 1 were mixed together in the same proportions as in Example 1. The resulting resin compositions were examined for impact strength in connection with the percentage of grafting and with the graft efficiency. The results were as shown in Table 1.

It can be seen from Table 1 that as the amount of the graft-linking agent is increased, the percentage of grafting as well as the graft efficiency increase greatly, that is, the amount of polymer not grafted decreases. The impact strength is found to converge to a certain value as the percentage of grafting increases.

TABLE 1

| γ-Methacryloyloxy-propyldimethoxy-methylsilane (part) | Average particle diameter of polyorganosiloxane rubber (μm) | Degree of swelling of polyorganosiloxane rubber | Polyorganosiloxane rubber content in graft copolymer (wt %) | Percentage of grafting (%) | Graft efficiency (%) | Izod impact strength (¼ in. thick, notched plate) (kg · cm/cm²) |
| --- | --- | --- | --- | --- | --- | --- |
| 0.1 | 0.14 | 10.7 | 33.3 | 28.2 | 14.1 | 16.0 |
| 0.2 | 0.14 | 10.6 | 33.3 | 47.0 | 23.5 | 24.7 |
| 0.4 | 0.14 | 11.3 | 33.3 | 68.8 | 34.4 | 39.0 |
| 0.75 | 0.14 | 10.2 | 33.3 | 93.5 | 46.8 | 48.0 |
| 1.0 | 0.15 | 11.6 | 33.3 | 113.0 | 56.5 | 45.0 |
| 2.0 | 0.15 | 10.7 | 33.3 | 145.0 | 72.5 | 46.3 |

COMPARATIVE EXAMPLE 1

A polyorganosiloxane rubber was prepared and then acrylonitrile and styrene were graft-polymerized thereon by the same procedure of Example 1 but using each of vinylsiloxane (0.75 part) or mercaptosiloxane (0.75 part) in place of γ-methacryloyloxypropyldimethoxymethylsilane for the preparation of the polyorganosiloxane. The graft copolymer was then blended similarly with the same acrylonitrile-styrene copolymer as used in Example 1. The obtained resin composition was extruded and molded similarly to Example 1. The percentage of grafting and graft efficiency in this graft polymerization and properties of molded pieces are shown in Table 2.

the same acrylonitrile-styrene copolymer as used in Example 1 were mixed together in the same proportions as in Example 1. The resulting resin composition was formed into specimens (¼ in. thick, molding-notched plate) for Izod impact tests. The impact strength was 43 kg.cm/cm².

COMPARATIVE EXAMPLES 2 and 3

Polyorganosiloxane rubbers and graft copolymers were prepared by following the procedure of Example 3 except that the amount of tetraethoxysilane, a cross-linking agent, was changed to 0.03 part and 20 parts. The obtained graft copolymers were each mixed with the same acrylonitrile-styrene copolymer as used in Example 1 in the same proportions as in Example 1.

TABLE 2

| Graft-linking agent | | Average particle diameter of polyorganosiloxane rubber (μm) | Degree of swelling of polyorganosiloxane rubber | Polyorganosiloxane rubber content in graft copolymer (wt %) | Percentage of grafting (%) | Graft efficiency (%) | Izod impact strength (¼ in. thick, notched plate) (kg · cm/cm²) | Gloss (%) |
| --- | --- | --- | --- | --- | --- | --- | --- | --- |
| Name | Amount of charge (mole %) | | | | | | | |
| Tetravinyl-tetramethyl-tetracyclo-siloxane | 0.75 | 0.14 | 10.9 | 33.3 | 21.3 | 10.8 | 14 | 73 |
| γ-Mercapto-propyl-dimethoxy-methyl-silane | 0.75 | 0.15 | 9.8 | 33.3 | 38.5 | 19.3 | 28 | 86 |

EXAMPLE 3

A polyorganosiloxane rubber was prepared and then acrylonitrile and styrene were graft-polymerized by the same procedure of Example 1 but using a mixture of tetraethoxysilane (0.25 part), γ-methacryloyloxypropyltrimethoxysilane (0.85 part), and octamethylcyclotetrasiloxane (100 parts) for the preparation of the polyorganosiloxane. Evaluation of the obtained graft copolymer indicated a percentage grafting of 98% and a graft efficiency of 49%. Average particle diameter of polyorganosiloxane rubber was 0.14 μm. The degree of swelling of the polyorganosiloxane rubber was 12.3. The polyorganosiloxane rubber centent in this graft copolymer was 33.3 wt %. This graft copolymer and Izod test specimens (¼ in. thick molding-notched plates) were molded from the prepared resin compositions in the same manner as in Example 1.

Table 3 shows physical properties of the polyorganosiloxanes, contents of polyorganosiloxane in the graft copolymers and Izod impact strengths of the test specimens.

TABLE 3

| Comparative Example | Amount of tetraethoxysilane used (part by wt) | Average particle diameter of polyorganosiloxane rubber (μm) | Degree of swelling of polyorganosiloxane | Polyorganosiloxane rubber content in graft copolymer (wt %) | Izod impact strength (¼ in. thick notched plate) (kg · cm/cm²) |
| --- | --- | --- | --- | --- | --- |
| 2 | 0.03 | 0.16 | 35 | 33.3 | 9 |
| 3 | 20 | 0.11 | 3.2 | 33.3 | 10.1 |

EXAMPLE 4

A portion (400 parts) of the polyorganosiloxane latex prepared in Example 1 was neutralized with aqueous $Na_2CO_3$ to pH 7.8 and then mixed with distilled water (700 parts) and with potassium persulfate (2.0 parts). The mixture was displaced into a separable flask equipped with a dropping funnel, condenser, nitrogen inlet port, and stirrer, and was heated to 74° C. under a stream of nitrogen. A mixture of methyl methacrylate (200 parts) and n-octyl mercaptan (0.2 part) was slowly added dropwise to the latex over about 3 hours. After 2 further hour's reaction, the mixture was cooled, and thereafter the procedure of Example 1 was followed. Evaluation of the obtained graft copolymer showed a percentage grafting of 103.5% and a graft efficiency of 51.8%. The polyorganosiloxane rubber content in this graft copolymer was 33.3 wt.%.

For comparison, a polyorganosiloxane latex (400 parts) was prepared by using each (0.75 part) of tetravinyltetramethylcyclotetrasiloxane and γ-mercaptopropyldimethoxymethylsilane. Graft polymerizations on these rubbers were conducted similarly to the above. Evaluation of the obtained graft copolymers indicated respective percentages of grafting of 13.6% and 41.3% and respective graft efficiencies of 6.8% and 20.7%.

The polyorganosiloxane-based graft copolymer obtained using 0.75 parts of γ-methacryloyloxypropyldimethoxymethylsilane as the graft-linking agent in Example 4 is referred to below for convenience as (A).

The polyorganosiloxane-based graft copolymers obtained using 0.75 parts each of tetravinyltetramethylcyclotetrasiloxane and γ-mercaptopropyldimethoxymethylsilane as the graft-linking agent for comparison in Example 4 are referred to (B) and (C), respectively.

These graft copolymers, (A), (B) and (C) were pelletized through a single screw extruder (L/D=25) at an extrusion temperature of 220° C. in the same manner as in Example 1. The resulting pellets were injection molded into ¼ inch thick molding-notched plate specimens for Izod impact testing. The Izod impact strength values of these specimens were measured in the same manner as in Example 1. The results are as follows:

| Kind of graft copolymer | Izod impact strength (kg · cm/cm$^2$) |
| --- | --- |
| (A) | 18.0 |
| (B) | 7.3 |
| (C) | 10.0 |

From these results it is evident that graft copolymer (A) obtained, when using γ-methacryloyloxypropyldimethoxymethylsilane capable of forming a unit represented by the formula (II) as graft-linking agent, because of its high graft efficiency, is fully compatible with the matrix resin and thus superior in impact resistance.

EXAMPLE 5

γ-Methacryloyloxypropyldimethoxymethylsilane (2.0 parts), tetraethoxysilane (2.0 parts) and octamethylcyclotetrasiloxane (100 parts) were mixed together, and added to distilled water (300 parts) containing dodecylbenzenesulfonic acid (1.0 part) dissolved, to form an emulsion. Thereafter, the procedure of Example 1 was followed to prepare a polyorganosiloxane. The yield of the polyorganosiloxane in latex was 89.8%. The degree of swelling of the polymer was 8.3. The particle size of the polymer was 0.13 μm as measured by the turbidity method. The latex was neutralized with aqueous Na$_2$CO$_3$, and distilled water (400 parts) and potassium persulfate (1.0 part) were added. The mixture was displaced into a separable flask equipped with a dropping funnel, condenser, nitrogen inlet port, and stirrer, and was heated to 75° C. under a stream of nitrogen. Then a mixture of acrylonitrile (25 parts) and styrene (75 parts) was slowly added dropwise over about 3 hours to be graft-polymerized. After completion of the addition, the polymerization was continued for about 2 hours to substantial completion thereof. Then the mixture was cooled. The particle size of the resulting latex was 0.30 μm. This latex was coagulated with a hot aqueous solution of CaCl$_2$.2H$_2$O to obtain a graft copolymer. The results of the graft polymerization indicated a percentage of grafting of 87.4% and a graft efficiency of 87.4%. The content of polyorganosiloxane in the graft copolymer was 50 wt %.

A mixture of 40 wt % of this graft copolymer and 0 wt % of the same acrylonitrile-styrene copolymer as used in Example 1 was heated to 220° C. and pelletized by using a single screw extruder (L/D=25). These pellets were injection molded into Izod test specimens (¼ in. thick molding-notched flat plates) and test specimens for surface gloss measurement. The test specimens showed an Izod impact strength of 41 kg.cm/cm$^2$ and a surface gloss of 89%.

COMPARATIVE EXAMPLE 4

γ-Methacryloyloxypropyldimethoxymethylsilane (2.0 parts) and octamethylcyclotetrasiloxane (100 parts) were mixed together, and added to distilled water (300 parts) containing dodecylbenzenesulfonic acid (1.0 part) dissolved, to form an emulsion. Thereafter, the procedure of Example 1 was followed to prepare a polyorganosiloxane. The yield of the polyorganosiloxane in latex was 89.8%. The particle size of the polymer was 0.13 μm as measured by the turbidity method. The latex was neutralized with aqueous Na$_2$CO$_3$, and distilled water (400 parts) and potassium persulfate (1.0 part) were added. The mixture was displaced into a separable flask equipped with a dropping funnel, condenser, nitrogen inlet port, and stirrer, and was heated to 75° C. under a stream of nitrogen. Then a mixture of acrylonitrile (25 parts) and styrene (75 parts) was slowly added dropwise over about 3 hours to be graft-polymerized. After completion of the addition, the polymerization was continued for about 2 hours to substantial completion thereof. Then the mixture was cooled. The particle size of the resulting latex was 0.30 μm. This latex was coagulated with a hot aqueous solution of CaCl$_2$.2H$_2$O to obtain a graft copolymer. The results of the graft polymerization indicated a percentage of grafting of 90.3% and a graft efficiency of 90.3%. The polyorganosiloxane rubber content in the graft copolymer was 50 wt %. Uniform and tough films can be formed by dissolving this graft copolymer in chloroform and drying the spread solution.

The degree of swelling of the polyorganosiloxane obtained above was measured in the same manner as described in the present specification. The polyorganosiloxane of Comparative Example 4, because of no use of polyfunctional crosslinking agent used at the time of its polymerization, dissolves in toluene solvent, and thus, the degree of swelling is infinite, that is, it cannot be measured.

Further, the resulting polyorganosiloxane-based graft copolymer was pelletized through a single screw extruder (L/D=25) at an extrusion temperature of 220° C. in the same manner as in Example 1. The resulting pellets were injection molded into specimens (molding-notched flat plate ¼ inch thick) in the same manner as in Example 1, and the Izod impact strength values of the obtained specimen, measured in the same manner as in Example 1, was 2.1 kg cm/cm$^2$.

From this result, it will be apparent that when polyorganosiloxane is not crosslinked its impact resistant performance cannot be displayed at all.

COMPARATIVE EXAMPLE 5

Tetraethoxysilane (4.0 parts), γ-methacryloyloxypropyldimethoxymethylsilane (0.75 part), octamethylcyclotetrasiloxane (100 parts), methyl methacrylate (200 parts), aluminum triacetylacetonate (0.5 part), and dicumyl peroxide (0.1 part) were mixed, filled in a mold of a compression molding machine, and heated at 200° C. for 15 minutes to prepare a graft copolymer. The graft efficiency was 15.3%, the degree of swelling of the whole graft copolymer was 43.6, and the polyorganosiloxane rubber content in the graft copolymer was 33.3 wt %.

This graft copolymer was finely pulverized in an automatic mortar, pelletized through a single screw extruder in the same manner as in Example 1, and injection molded into Izod test specimens (¼ in. thick molding-notched flat plates). The found Izod impact strength was 2.4 kg.cm/cm$^2$, that is, this graft copolymer did not exhibit sufficient ability for use as a impact-resistant resin.

What is claimed is:

1. An impact-resistant, thermoplastic polyorganosiloxane-based graft copolymer produced by the emulsion graft polymerization of at least one vinyl monomer on an emulsion-polymerized polyorganosiloxane which consists of 90 to 99.8 mole % of an organosiloxane unit represented by the formula $$R'_2SiO_{2/2} \quad (I)$$

wherein R' is the same or different and denotes methyl, ethyl, propyl, or phenyl, 0.1 to 10 mole % of a unit derived from a graft-linking agent, said unit being represented by the formula

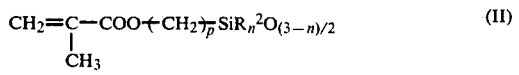

wherein; R$^2$ denotes methyl, ethyl, propyl, or phenyl; n denotes a number of 0, 1, and 2; and p denotes a number of 1 to 6, and 0.1 to 10 mole % of a unit derived from a tetrafunctional silane crosslinking agent, said unit being represented by the formula $$SiO_{4/2} \quad (III),$$

said polyorganosiloxane showing a degree of swelling of 5 to 15 in toluene, and said graft copolymer containing said polyorganosiloxane in an amount of 10 to 70% by weight.

2. The impact-resistant, thermoplastic polyorganosiloxane-based graft copolymer of claim 1, wherein the unit derived from a graft-linking agent is represented by the formula

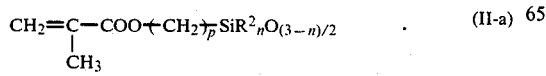

wherein, p is a number of 2 to 4 and R$^2$ and n are as defined in claim 1.

3. The impact-resistant, thermoplastic polyorganosiloxane-based graft copolymer of claim 1, wherein the unit derived from a graft-linking agent is represented by the formula

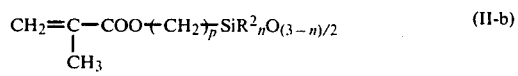

wherein, p is 3 and R$^2$ and n are as defined in claim 1.

4. The impact-resistant, thermoplastic polyorganosiloxane-based graft copolymer of claim 1, wherein the unit represented by the formula (III) is derived from tetramethoxysilane or tetraethoxysilane.

5. The impact-resistant, thermoplastic polyorganosiloxane-based graft copolymer of claim 1, wherein the unit represented by the formula (III) is derived from tetraethoxysilane.

6. The impact-resistant, thermoplastic polyorganosiloxane-based graft copolymer of claim 1 which contains the polyorganosiloxane in an amount of 20 to 60% by weight 7. The impact-resistant, thermoplastic polyorganosiloxane-based graft copolymer of claim 1, wherein the vinyl monomer is at least one member selected from the group consisting of aromatic alkenyl compounds and vinyl cyanide compounds.

8. The impact-resistant, thermoplastic polyorganosiloxane-based graft copolymer of claim 1, wherein the particle diameters of the polyorganosiloxane are from 0.05 to 1 μm.

9. The impact-resistant, thermoplastic polyorganosiloxane-based graft copolymer of claim 1, wherein the particle diameters of the polyorganosiloxane are from 0.08 to 0.5 μm.

10. A process for producing an impact-resistant, thermoplastic polyorganosiloxane-based graft copolymer, which comprises the steps of (A) emulsion copolymerization of
(i) an organosiloxane compound capable of forming an organosiloxane unit represented by the formula $$R'_2SiO_{2/2} \quad (I)$$

wherein R' is the same or different and denotes methyl, ethyl, propyl, or phenyl, (ii) a graft-linking agent capable of forming a unit represented by the formula

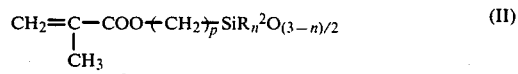

wherein, R$^2$ denotes methyl, ethyl, propyl or phenyl; n denotes a number of 0, 1, and 2; and p denotes a number of 1 to 6, and (iii) a tetrafunctional silane crosslinking agent capable of forming a unit represented by the formula $$SiO_{4/2} \quad (III)$$

to prepare a polyorganosiloxane which consists of 90 to 99.8 mole % of the unit of the formula (I), 0.1 to 10 mole % of the unit of the formula (II), and 0.1 to 10 mole % of the unit of the formula (III) and shows a degree of swelling of 5 to 15 in toluene, and (B) emulsion graft polymerization of at least one vinyl monomer on said polyorganosiloxane to produce the intended graft copolymer containing said polyorganosiloxane in an amount of 10 to 70% by weight.

11. The process for producing an impact-resistant, thermoplastic polyorganosiloxane-based graft copolymer according to claim 10 wherein the graft-linking agent is capable of forming a unit represented by the formula

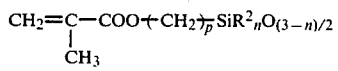
(II-a)

wherein, p is a number of 2 to 4 and $R^2$ and n are as defined in claim 10.

12. The process for producing an impact-resistant, thermoplastic polyorganosiloxane-based graft copolymer according to claim 10, wherein the graft-linking agent is capable of forming a unit represented by the formula

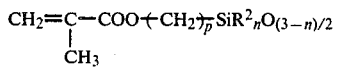
(II-b)

wherein, p is 3 and $R^2$ and n are as defined in claim 10.

13. The process for producing an impact-resistant, thermoplastic polyorganosiloxane-based graft copolymer according to claim 10, wherein the tetrafunctional silane crosslinking agent is tetramethoxysilane or tetraethoxysilane.

14. The process for producing an impact-resistant, thermoplastic polyorganosiloxane-based graft copolymer according to claim 10, wherein the tetrafunctional silane crosslinking agent is tetraethoxysilane.

15. The process for producing an impact-resistant, thermoplastic polyorganosiloxane-based graft copolymer according to claim 10, wherein the polyorganosiloxane content in the graft copolymer is controlled to 20 to 60% by weight.

16. The process for producing an impact-resistant, thermoplastic polyorganosiloxane-based graft copolymer according to claim 10, wherein the vinyl monomer is at least one member selected from the group consisting of aromatic alkenyl compounds and vinyl cyanide compounds.

17. The process for producing an impact-resistant, thermoplastic polyorganosiloxane-based graft copolymer according to claim 10, wherein the particle diameters of the polyorganosiloxane are from 0.05 to 1 μm.

18. The process for producing an impact-resistant, thermoplastic polyorganosiloxane-based graft copolymer according to claim 10, wherein the particle diameters of the polyorganosiloxane are from 0.08 to 0.5 μm.

* * * * *